US011597497B2

United States Patent
Kuhlmann et al.

(10) Patent No.: US 11,597,497 B2
(45) Date of Patent: Mar. 7, 2023

(54) LEADING EDGE STRUCTURE FOR AN AERODYNAMIC SURFACE OF AN AIRCRAFT

(71) Applicant: Airbus Operations GmbH, Hamburg (DE)

(72) Inventors: Guido Kuhlmann, Hamburg (DE); Hubert Temmen, Hamburg (DE); René Schröder, Hamburg (DE); Wilhelm Rombs, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 105 days.

(21) Appl. No.: 17/153,077

(22) Filed: Jan. 20, 2021

(65) Prior Publication Data

US 2021/0316838 A1     Oct. 14, 2021

(30) Foreign Application Priority Data

Jan. 20, 2020 (DE) .......................... 102020101195.4

(51) Int. Cl.
  *B64C 3/28* (2006.01)
  *B64C 3/18* (2006.01)
  (Continued)

(52) U.S. Cl.
  CPC .............. *B64C 3/28* (2013.01); *B64C 3/185* (2013.01); *B64C 3/26* (2013.01); *B64C 5/06* (2013.01)

(58) Field of Classification Search
  CPC ........ B64C 3/28; B64C 3/26; B64C 2003/143
  See application file for complete search history.

(56) References Cited

U.S. PATENT DOCUMENTS

| 8,746,619 B2 | 6/2014 | Li et al. |
| 2013/0175402 A1 | 7/2013 | Voege |
| 2017/0259902 A1 | 9/2017 | Cebolla Garrofe et al. |

FOREIGN PATENT DOCUMENTS

| DE | 102010034305 A1 | 2/2012 |
| DE | 102010036154 A1 | 3/2012 |

(Continued)

OTHER PUBLICATIONS

German Search Report; priority document.
European Search Report and Written Opinion for corresponding European Patent Application No. 21150582 dated Jun. 4, 2021.

*Primary Examiner* — Timothy D Collins
*Assistant Examiner* — Eric Acosta
(74) *Attorney, Agent, or Firm* — Greer, Burns & Crain, Ltd.

(57) ABSTRACT

A leading edge structure for an aerodynamic surface of an aircraft with an outer wall part curved in a streamlined manner around an interior compartment and having an inner surface pointing toward the interior compartment and an outer surface provided for contact with the external surrounding flow. The outer wall part has a first outer wall section extending from a leading edge point in an incident flow direction in a convexly curved manner in the direction of a first side. The outer wall part has a second outer wall section which extends from the leading edge point in the incident flow direction in a convexly curved in the direction of a second side. An inner wall part is arranged in the interior compartment opposite the inner surface of the outer wall part and extends from the first outer wall section to the second outer wall section.

14 Claims, 2 Drawing Sheets

(51) Int. Cl.
*B64C 3/26* (2006.01)
*B64C 5/06* (2006.01)

(56) References Cited

FOREIGN PATENT DOCUMENTS

| | | | |
|---|---|---|---|
| EP | 0361286 | A2 | 4/1990 |
| EP | 0502900 | B1 * | 11/1996 |
| EP | 3216693 | A1 | 9/2017 |

* cited by examiner

LEADING EDGE STRUCTURE FOR AN AERODYNAMIC SURFACE OF AN AIRCRAFT

CROSS-REFERENCES TO RELATED APPLICATIONS

This application claims the benefit of the German patent application No. 102020101195.4 filed on Jan. 20, 2020, the entire disclosures of which are incorporated herein by way of reference.

FIELD OF THE INVENTION

The present invention relates to a leading edge structure, in particular a leading edge structure which can tolerate bird strikes, for an aerodynamic surface of an aircraft, in particular for a wing, a vertical stabilizer unit or an elevator unit of an aircraft. Other applications of the leading edge structure, such as on a rotor blade, for example, of a helicopter, are likewise conceivable and intended, however. A further aspect of the invention relates to an aerodynamic surface in the form of a wing, a vertical stabilizer unit or an elevator unit for an aircraft, in particular for an airplane, with a leading edge structure of this type. Another aspect of the invention relates to an aircraft, in particular an airplane, with a leading edge structure of this type or with an aerodynamic surface of this type.

BACKGROUND OF THE INVENTION

The leading edge structure comprises an outer wall part which is curved in a streamlined manner around an interior compartment and extends in a wingspan direction. Furthermore, the outer wall part comprises an inner surface which points toward the interior compartment and an outer surface which is provided for contact with the external surrounding flow. The outer wall part comprises a first outer wall section which extends from a leading edge point in an incident flow direction in a manner which is curved convexly in the direction of a first side, and a second outer wall section which extends from the leading edge point in the incident flow direction in a manner which is curved convexly in the direction of a second side. The leading edge point is that point, at which the outer surface of the outer wall part lies perpendicularly with respect to the incident flow direction of the outer surrounding flow. The incident flow direction relates to the incident flow during cruising flight straight ahead under normal conditions.

Furthermore, the leading edge structure comprises an inner wall part which is arranged in the interior compartment opposite the inner surface of the outer wall part and extends in the wingspan direction. The inner wall part extends from the first outer wall section to the second outer wall section and is preferably connected to the latter. A cavity preferably extends between the inner wall part and the outer wall part.

Similar leading edge structures are known from the prior art. Leading edge structures are those parts of aircraft which are frequently affected by bird strikes and therefore have to be designed to be tolerant with respect to bird strikes. It is therefore known from the prior art, in order to reinforce the leading edge structure against bird strikes, for example, for sandwich structures with a honeycomb core or rib-reinforced fiber composite components to be used. Structures of this type are complicated and expensive to produce, however.

SUMMARY OF THE INVENTION

Therefore, it is an object of the present invention to provide a particularly simple leading edge structure which is inexpensive and easy to produce and can reliably tolerate bird strikes and can sufficiently protect the structure which lies behind it.

This object is achieved by virtue of the fact that the inner wall part has an edge which points toward the inner surface of the outer wall part, preferably a sharp and/or wedge-shaped edge. As a result of an edge of this type on the inner wall part, a bird, if it penetrates the outer wall part, can reliably be broken up along the edge and/or deflected to the outside, with the result that, in this case, at least the inner wall part survives the bird strike undamaged or at least undamaged to such an extent that the structure which lies behind it, in particular the front strut or the torsion box, remains undamaged and further flight, at least as far as the next airport, is possible.

Furthermore, the outer wall part and/or the inner wall part can have reinforcement elements which preferably extend in an elongate manner either in the wingspan direction or transversely with respect to the wingspan direction along the outer wall part and/or the inner wall part, preferably along that surface of the outer wall part and/or inner wall part which points toward the interior compartment.

In one preferred embodiment, the inner wall part has a first inner wall section which extends from the edge in the direction of the first side and in the incident flow direction as far as the first outer wall section, and has a second inner wall section which extends from the edge in the direction of the second side and in the incident flow direction as far as the second outer wall section. In this way, the inner wall part is given a wedge shape, with the result that birds which strike the inner wall part to the side of the edge, and parts of birds which have been broken up by way of the edge, are deflected by way of the first and second inner wall section laterally toward the first and second side and in the incident flow direction, and, in particular, slide on the first and second inner wall section.

It is particularly preferred here that the first inner wall section has a straight course from the edge as far as the first outer wall section, and/or that the second inner wall section has a straight course from the edge as far as the second outer wall section. In this way, the inner wall part has a classic wedge shape, by way of which birds or parts of birds can slide off laterally in a particularly satisfactory manner, and which, furthermore, can be manufactured simply and has a high rigidity.

Furthermore, it is preferred here if the first inner wall section and the second inner wall section enclose an angle of between 300 and 150°, preferably of between 600 and 120°, further preferably of between 800 and 100°. In this way, a particularly effective wedge shape is formed, by way of which birds or parts of birds can slide off laterally in a particularly satisfactory manner.

In one preferred embodiment, the first outer wall section has a first outer wall fastening end in a manner which faces away from the leading edge point, the second outer wall section has a second outer wall fastening end in a manner which faces away from the leading edge point, the first inner wall section has a first inner wall fastening end in a manner which faces away from the edge, and the second inner wall section has a second inner wall fastening end in a manner which faces away from the edge. Here, preferably, either the first inner wall fastening end is fastened, preferably welded, to the first outer wall section and the second inner wall fastening end is fastened, preferably welded, to the second outer wall section, and the first and second outer wall fastening end are set up for fastening to a front spar or a torsion box of an aerodynamic surface. As an alternative, the first outer wall fastening end is fastened, preferably welded but possibly also adhesively bonded, riveted or screwed, to the first inner wall section and the second outer wall fastening end is fastened, preferably welded but possibly also adhesively bonded, riveted or screwed, to the second inner wall section, and the first and second inner wall fastening end are set up for fastening to the front spar or torsion box of an aerodynamic surface. In this way, either the inner wall part is connected via the outer wall part or the outer wall part is connected via the inner wall part to the front spar or torsion box of the aerodynamic surface. It is also possible, however, that the inner and outer wall parts are connected in parallel with one another, for example directly or via an intermediate piece, to the front spar or torsion box. It is also possible that the inner and outer wall parts are connected to the aerodynamic surface differently than via the front spar or the torsion box.

In a further preferred embodiment, the edge is of sharp configuration in such a way that it has a curvature radius of between 0.1 mm and 20 mm, preferably of between 0.5 mm and 10 mm, further preferably of between 1 mm and 8 mm. A sharp edge of this type can break up striking birds in a particularly satisfactory manner, without the edge being damaged. Ultimately, the edge should be as sharp as possible in so far as this is appropriately possible using manufacturing technology.

In another preferred embodiment, the edge is arranged in an extension of the leading edge point in the incident flow direction. In this way, the probability can be increased that a bird will strike in the region of the edge. In some cases, such as, for example, in the case of the use of the leading edge structure on a vertical stabilizer unit, it is preferred if the edge is arranged centrally between the first and second inner wall fastening end, preferably on the line of symmetry in the case of symmetrically formed inner wall parts.

In another preferred embodiment, the outer wall part and the inner wall part are configured in such a way, in particular the material and/or the shape of the outer wall part and the inner wall part are/is adapted in such a way, that, in the case of a bird strike preferably in the incident flow direction of a realistically considered bird, in particular a bird of average size and weight, the outer wall part is shattered, in particular penetrated, and the inner wall part is not destroyed or is destroyed merely to such an extent that the structure which lies behind it, in particular the front spar or the torsion box, is not destroyed. In this case, in the case of the destruction of the outer wall part, a large part of the impact energy of the bird can be absorbed, with the result that, after penetrating the outer wall part, the bird strikes the inner wall part with considerably reduced energy. As a result, the inner wall part can be designed with reduced strength or impact strength and therefore also with reduced weight. Overall, therefore, the overall weight of the leading-edge structure can be minimized in this way, since the outer wall part does not have to be designed to be so strong that it withstands a bird strike in every case, and the inner wall part has to be designed only in such a way that it withstands a bird strike with considerably reduced impact energy as a result of the energy absorption of the outer wall part, in such a way that the structure which lies behind it is not destroyed. It is ensured at the same time that at least the inner wall part survives in every case, since a bird strike would never destroy the outer and inner wall part on account of the corresponding design.

In another preferred embodiment, the inner wall part is configured in such a way, in particular the material and/or the shape are/is adapted in such a way, that it has an impact strength which is higher than the impact strength of the outer wall part. It is also possible, however, that the impact strength of the outer wall part is higher than the impact strength of the inner wall part, with the result that as great a part as possible of the impact energy of a bird is already absorbed by way of the outer wall part or its destruction. In every case, the outer wall part and the inner wall part are adapted here in such a way that, although the outer wall part is shattered in the case of a bird strike, the inner wall part is not destroyed or is destroyed merely to such an extent that the structure which lies behind it is not destroyed.

In another preferred embodiment, the outer wall part and/or the inner wall part are formed from a fiber composite material, preferably as a thermoplastic organic sheet. Organic sheets are prefabricated, in particular pre-laid planar fiber composite sheets which can be reshaped on site under the influence of heat. In this way, a simple and inexpensive manufacturing process is provided, since the organic sheets do not have to be prefabricated or pre-laid, but rather are available as prefabricated mass produced articles. The outer part and the inner part are preferably welded to one another, which is made possible by way of the thermoplastic material of the organic sheets. As an alternative to organic sheets, for example, metal sheets can also be used, in the case of which reshaping on site is possible even without the influence of heat.

A further aspect of the present invention relates to an aerodynamic surface in the form of a wing, a vertical stabilizer unit or an elevator unit for an aircraft, in particular, an airplane. The aerodynamic surface has a front spar or a torsion box, a first skin element on the first side, a second skin element on the second side, and a leading edge structure in accordance with one of the above-described embodiments. Preferably, either the first and second outer wall fastening end or the first and second inner wall fastening end are fastened to the front spar or torsion box, preferably in such a way that the first outer wall fastening end is flush with the first skin element and the second outer wall fastening end is flush with the second skin element, or the first inner wall fastening end is flush with the first skin element and the second inner wall fastening end is flush with the second skin element. In the case of a vertical stabilizer unit, the aerodynamic surface including the leading edge structure can be of symmetrical configuration. In the case of a wing or an elevator unit, the shape of the aerodynamic surface including the leading edge structure can deviate from a symmetrical shape. The features and advantages which were described above in conjunction with the leading edge structure also apply to the aerodynamic surface.

Another aspect of the present invention relates to an aircraft, in particular an airplane, with a leading edge structure in accordance with one of the above-described embodiments or with an aerodynamic surface in accordance with one of the above-described embodiments. The features and advantages which were described above in conjunction with the leading edge structure and the aerodynamic surface also apply to the aircraft.

BRIEF DESCRIPTION OF THE DRAWINGS

One exemplary embodiment of the present invention will be described in greater detail in the following text on the basis of the drawing, in which.

DETAILED DESCRIPTION OF THE PREFERRED EMBODIMENTS

Figure 1:
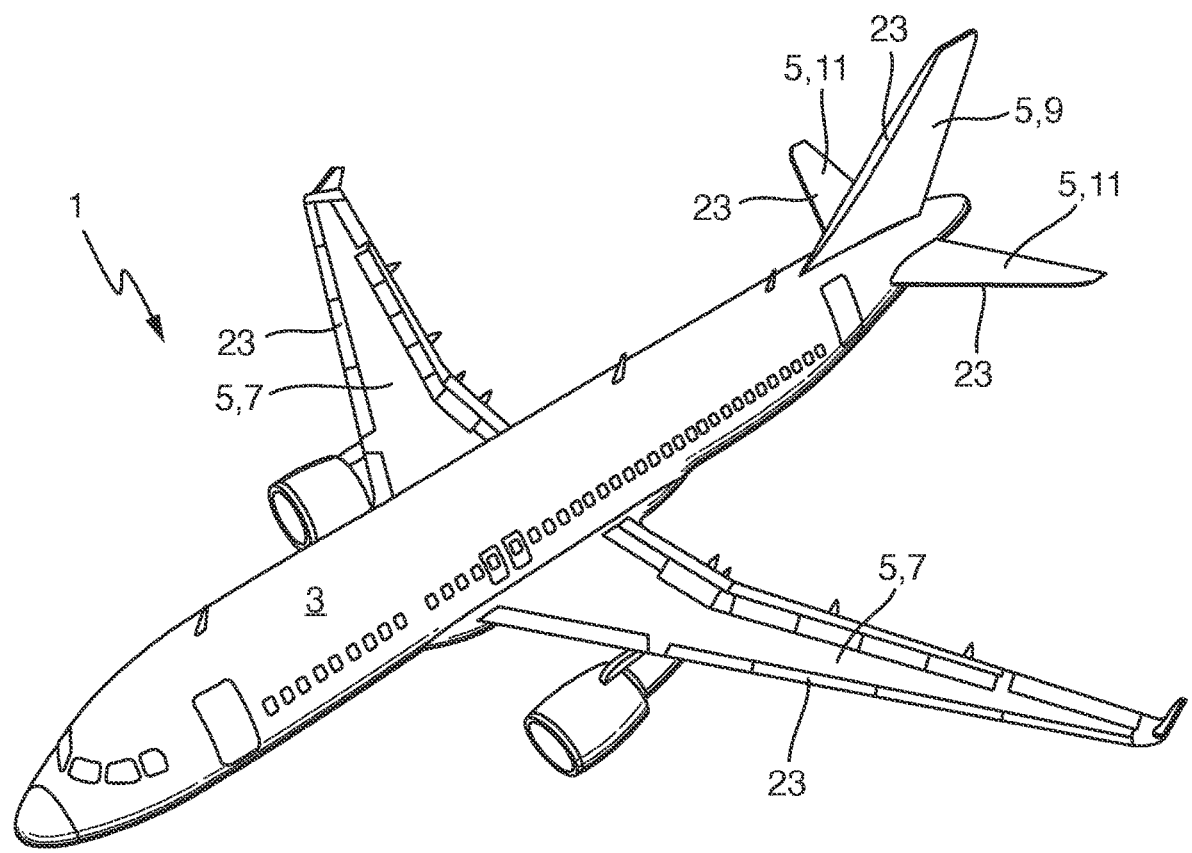
FIG. 1 shows a perspective view of an aircraft with a leading edge structure in accordance with one exemplary embodiment of the invention.

FIG. 1 shows an aircraft 1 according to the invention in the form of an airplane. The aircraft 1 comprises a fuselage 3 and a plurality of aerodynamic surfaces 5 in the form of a wing 7, a vertical stabilizer unit 9 and an elevator unit 11. The aerodynamic surfaces 5 in the form of the wing 7, the vertical stabilizer unit 9 and the elevator unit 11 have a front spar 13, a first skin element 15 on a first side 17, a second skin element 19 on a second side 21, and a leading edge structure 23 in accordance with one exemplary embodiment of the invention.

Figure 2:
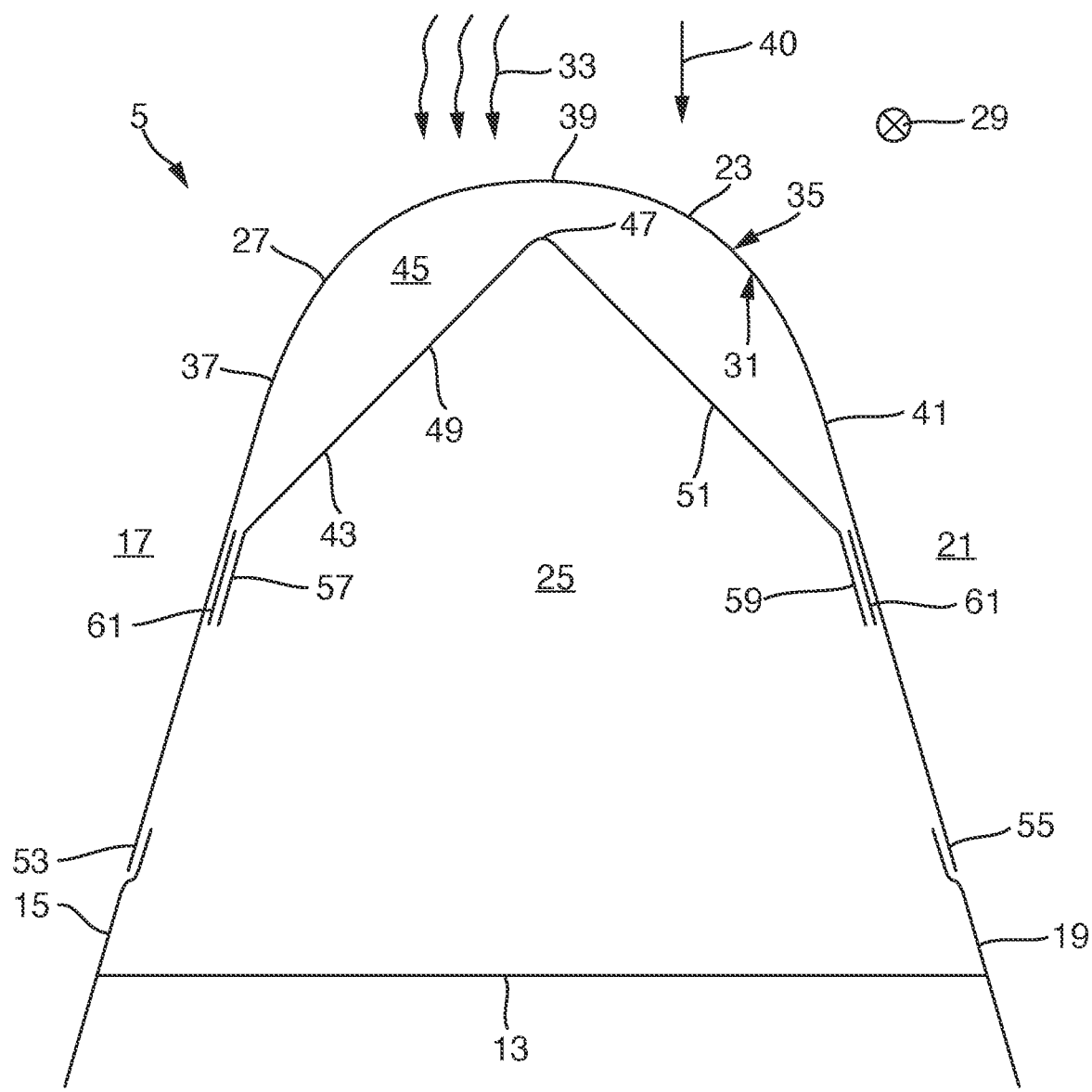
FIG. 2 shows a diagrammatic cross-sectional view of a leading edge structure of the aircraft from FIG. 1.

The leading edge structure 23, which is shown in FIG. 2, comprises an outer wall part 27 which is curved in a streamlined manner around an interior compartment 25 and extends in a wingspan direction 29. Furthermore, the outer wall part 27 has an inner surface 31 which points toward the interior compartment 25 and an outer surface 35 which is provided for contact with an external surrounding flow 33. The outer wall part 27 comprises a first outer wall section 37 which extends from a leading edge point 39 in an incident flow direction 40 in a manner which is curved convexly in the direction of the first side 17, and a second outer wall section 41 which extends from the leading edge point 39 in the incident flow direction 40 in a manner which is curved convexly in the direction of the second side 21. The leading edge point 39 is that point at which the outer surface 35 of the outer wall part 27 lies perpendicularly with respect to an incident flow direction 40 of the outer surrounding flow 33.

Furthermore, the leading edge structure 23 comprises an inner wall part 43 which is arranged in the interior compartment 25 opposite the inner surface 31 of the outer wall part 27 and extends in the wingspan direction 29. The inner wall part 43 extends from the first outer wall section 37 to the second outer wall section 41 and is connected to the latter. A cavity 45 is provided between the inner wall part 43 and the outer wall part 27. The inner wall part 43 has a sharp edge 47 which points toward the inner surface 31 of the outer wall part 27 and by way of which a bird, if it penetrates the outer wall part 27, can reliably be broken up along the edge 47 and deflected to the outside.

Furthermore, the inner wall part 43 has a first inner wall section 49 which extends in a straight line from the edge 47 in the direction of the first side 17 and in the incident flow direction 40 as far as the first outer wall section 37, and has a second inner wall section 51 which extends in a straight line from the edge 47 in the direction of the second side 21 and in the incident flow direction 40 as far as the second outer wall section 41, with the result that the inner wall part 43 has a wedge shape. Here, the first inner wall section 49 and the second inner wall section 51 enclose an angle of approximately 90°. The edge 47 is configured to be so sharp that it has a curvature radius of approximately 5 mm. Furthermore, the edge 47 is arranged in an extension of the leading edge point 39 in the incident flow direction 40.

The first outer wall section 37 has a first outer wall fastening end 53 in a manner which faces away from the leading edge point 39, the second outer wall section 41 has a second outer wall fastening end 55 in a manner which faces away from the leading edge point 39, the first inner wall section 49 has a first inner wall fastening end 57 in a manner which faces away from the edge 47, and the second inner wall section 51 has a second inner wall fastening end 59 in a manner which faces away from the edge 47. Here, the first inner wall fastening end 57 is fastened to the first outer wall section 37, and the second inner wall fastening end 59 is fastened to the second outer wall section 41 by means of a welded connection 61. At the same time, the first and second outer wall fastening end 53, 55 are fastened, for example riveted or screwed, to the front spar 13 of the aerodynamic surface 5.

The outer wall part 27 and the inner wall part 43 are configured in such a way that, in the case of a bird strike, the outer wall part 27 is penetrated, but the inner wall part 43 is not destroyed or is destroyed merely to such an extent that the structure which lies behind it is not destroyed. To this end, the inner wall part 43 is configured in such a way that it has an impact strength which is higher than the impact strength of the outer wall part 27. Here, the outer wall part 27 and the inner wall part 43 are formed from a fiber composite material in the form of a thermoplastic organic sheet, by way of which the required impact strength can be adapted in a satisfactory manner.

The first and the second outer wall fastening end 53, 55 are fastened to the front spar 13 in such a way that the first outer wall fastening end 53 is flush with the first skin element 15 and the second outer wall fastening end 55 is flush with the second skin element 19.

A leading edge structure 23 of this type can be of particularly simple and inexpensive configuration, and at the same time has a particularly high tolerance with respect to bird strike, since, as a result of the double-walled construction, the impact energy of a bird is absorbed to a great extent by way of destruction of the outer wall part 27, and the bird which strikes the inner wall part 43 with reduced energy does not destroy the inner wall part 43, but rather is broken up by the latter and is deflected laterally.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A leading edge structure for an aerodynamic surface of an aircraft comprising:

an outer wall part which is curved in a streamlined manner around an interior compartment and has an inner surface which points toward the interior compartment and an outer surface which is provided for contact with an external surrounding flow, which outer wall part has a first outer wall section which extends from a leading edge point in an incident flow direction in a manner which is curved convexly in a direction of a first side, and which outer wall part has a second outer wall section which extends from the leading edge point in the incident flow direction in a manner which is curved convexly in a direction of a second side, an inner wall part which is arranged in the interior compartment opposite the inner surface of the outer wall part and extends from the first outer wall section to the second outer wall section, wherein the inner wall part has an edge which points toward the inner surface of the outer wall part, wherein at least one of the outer wall part or the inner wall part are formed from a fiber composite material provided as a thermoplastic organic sheet, wherein the outer wall part comprises a first outer wall fastening end and a second outer wall fastening end, the first outer wall fastening end joined to a first skin element and the second outer wall fastening end joined to a second skin element, wherein the inner wall part comprises a first inner wall fastening end and a second inner wall fastening end, the first inner wall fastening end and the second inner wall fastening end joined to the inner surface of the outer wall part, and wherein the inner wall part is free from attachment to either the first skin element or the second skin element.

2. The leading edge structure as claimed in claim 1, the inner wall part having a first inner wall section which extends from the edge in the direction of the first side and in the incident flow direction as far as the first outer wall section, and having a second inner wall section which extends from the edge in the direction of the second side and in the incident flow direction as far as the second outer wall section.

3. The leading edge structure as claimed in claim 2, wherein, at least one of
the first inner wall section has a straight course from the edge as far as the first outer wall section, or
the second inner wall section has a straight course from the edge as far as the second outer wall section.

4. The leading edge structure as claimed in claim 2, the first inner wall section and the second inner wall section enclosing an angle of between 30° and 150°.

5. The leading edge structure as claimed in claim 2, the first inner wall section and the second inner wall section enclosing an angle of between 60° and 120°.

6. The leading edge structure as claimed in claim 2, the first inner wall section and the second inner wall section enclosing an angle of between 80° and 100°.

7. The leading edge structure as claimed in claim 2, wherein the first outer wall fastening end faces away from the leading edge point, the second outer wall fastening end faces away from the leading edge point, the first inner wall fastening end faces away from the edge, the second inner wall fastening end faces away from the edge.

8. The leading edge structure as claimed in claim 1, the edge being of sharp configuration in such a way that it has a curvature radius of between 0.1 mm and 20 mm.

9. The leading edge structure as claimed in claim 1, the edge being of sharp configuration in such a way that it has a curvature radius of between 0.5 mm and 10 mm.

10. The leading edge structure as claimed in claim 1, the edge being of sharp configuration in such a way that it has a curvature radius of between 1 mm and 8 mm.

11. The leading edge structure as claimed in claim 1, the edge being arranged in an extension of the leading edge point in the incident flow direction.

12. The leading edge structure as claimed in claim 1, the outer wall part and the inner wall part being configured such that, upon a bird strike, the outer wall part is shattered and the inner wall part is not destroyed.

13. The leading edge structure as claimed in claim 1, the inner wall part being configured such that it has an impact strength which is either higher or lower than the impact strength of the outer wall part.

14. An aircraft with a leading edge structure as claimed in claim 1.

* * * * *